Figure 1:
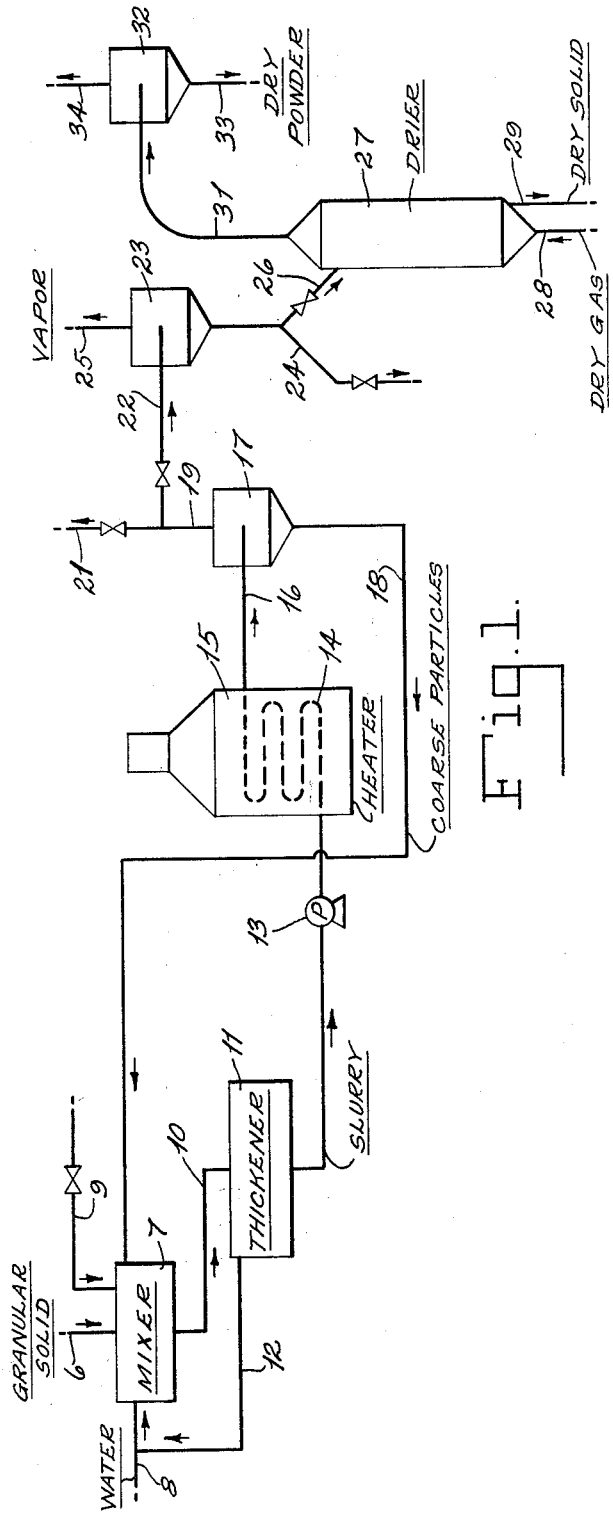

Dec. 16, 1958 C. R. CARKEEK ET AL 2,864,560
PROCESS FOR TRANSPORTING SOLID MATERIALS, WITH OR
WITHOUT CONCURRENT DISINTEGRATION
Filed March 8, 1955 2 Sheets-Sheet 1

INVENTORS
CHARLES R. CARKEEK
du BOIS EASTMAN
LEON P. GAUCHER
BY
ATTORNEYS

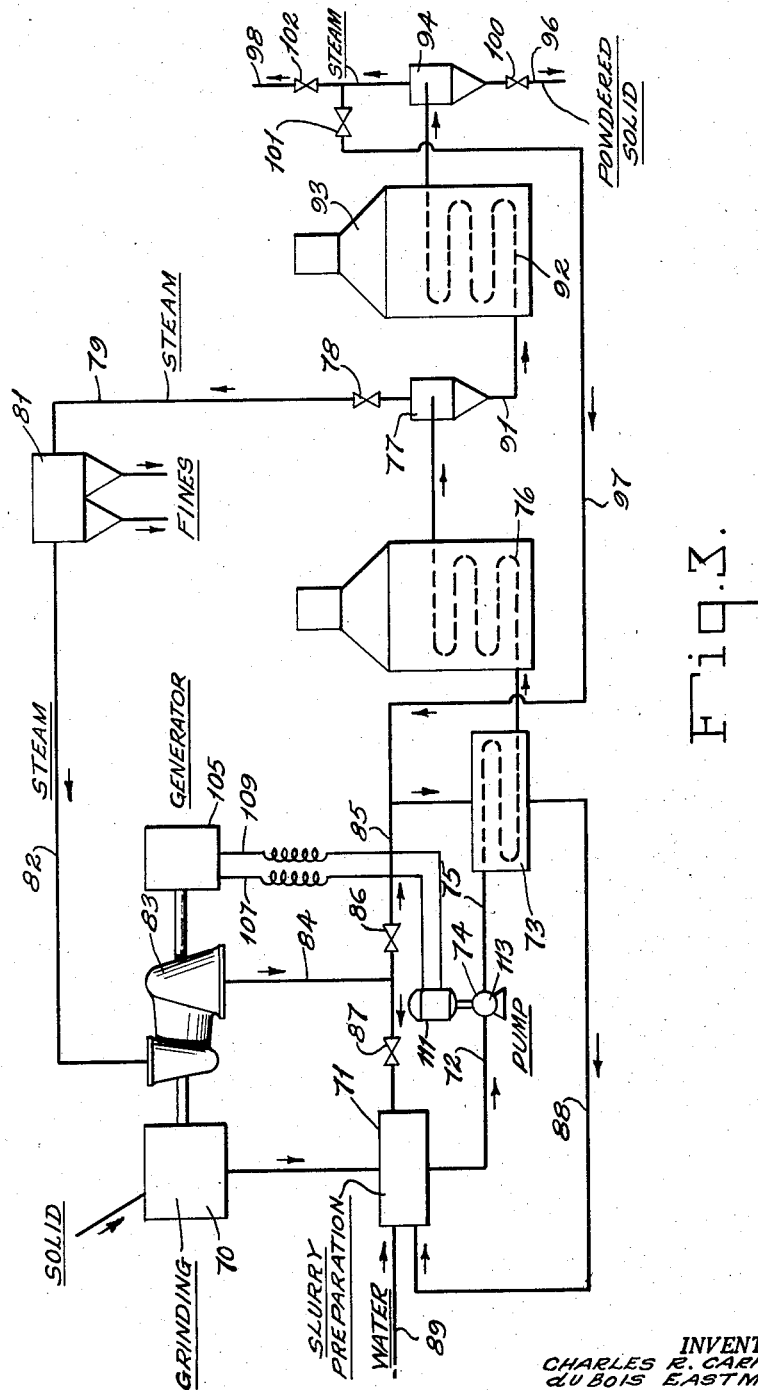

2,864,560

PROCESS FOR TRANSPORTING SOLID MATERIALS, WITH OR WITHOUT CONCURRENT DISINTEGRATION

Charles R. Carkeek, Pasadena, Du Bois Eastman, Whittier, Calif., and Leon P. Gaucher, Beacon, N. Y., assignors to The Texas Company, New York, N. Y., a corporation of Delaware Application March 8, 1955, Serial No. 492,878

10 Claims. (Cl. 241—5)

This invention relates to a process for the transportation of solid materials, with or without concurrent disintegration.

The process of this invention provides a novel method by which frangible solid materials may be economically disintegrated or pulverized, and at the same time dried, if desired, without resorting to usual power-consuming methods. Auxiliary power may be generated for plant use, for preliminary crushing and grinding, etc. The process may be used for reducing the particle size of various minerals in granular form and may be applied to the pulverization of coal, limestone, gypsum, chalk, clay, marl, talc, and various other solids.

An object of this invention is to provide an improved process for economically transporting finely divided solid particles. Another object is to reduce the particle size of frangible solid materials. Another object is to provide an improved process for simultaneously grinding a solid material and generating steam for process use and/or the generation of power. Other objects and advantages will be apparent from the following detailed description.

This application is a continuation-in-part of our application Serial No. 200,648, filed December 13, 1950 (now abandoned), which in turn was a continuation-in-part of our application Serial No. 110,442, filed August 15, 1949 (now abandoned in favor of Patent 2,735,787 of Eastman and Gaucher), which in turn was a continuation-in-part of application Serial No. 49,626, filed September 16, 1948 by Eastman and Gaucher (now abandoned).

In accordance with one embodiment of the present invention involving grinding, a frangible solid material in granular form is admixed with sufficient vaporizable liquid to produce a fluid suspension or slurry. The slurry is passed through a pipeline to and through a heating zone as a confined stream at a relatively high velocity. The stream is heated to a temperature at least sufficient to vaporize the liquid. Vaporization of the liquid results in a great increase in volume which, in turn, greatly increases the velocity of flow of the stream. The solid particles are suspended in the stream of vapor formed upon heating and subjected to the disintegrating action of the high velocity and highly turbulent flow of the confined stream of vapors. A minimum vapor velocity of about 25 feet per second is generally required for disintegration, and the extent of disintegration increases with increasing velocity, substantial disintegration occurring above 100 feet per second.

The liquid used for preparation of the suspension should be stable and substantially inert with respect to reaction with the solid at the temperature of the heating zone. Generally, water and liquid hydrocarbons are the most suitable liquid for this purpose. However, various other liquids may be used, for example, hydrocarbons, coal tar distillates, alcohols, glycols, mercury, diphenyl, carbon tetrachloride, and the like.

The quantity of liquid admixed with the solid to form a fluid slurry may vary considerably. A minimum of about 35 percent liquid by volume is required, based upon the apparent volume of the granular solid. The slurry may be readily pumped with suitable equipment, for example, with a piston pump of the type commonly used for handling drilling mud in well drilling operations.

In most applications of this process, the solid feed material need be reduced only to a particle size such that it may be readily handled as a suspension or slurry. It is preferable to use particles smaller than about ¼ inch in average diameter. Particles of 100 mesh size and smaller are most readily handled as a slurry. The solids may be crushed mechanically to from about ¼ inch in average diameter to about 100 mesh size with a relatively small expenditure of power. Further reduction in size by conventional mechanical means becomes progressively more expensive, mechanical pulverization requiring large expenditures of power. The present process possesses important advantages over conventional pulverization in that the amount of mechanical power required to convert a granular solid to fine powder is relatively small. The major portion of the energy required for pulverization is supplied by heating the slurry. Heat may be obtained from an inexpensive source whereby considerable savings may be realized as compared with conventional mechanical pulverization. At the same time, steam generated on heating the slurry may be separated from the powdered solid and used for the generation of power in a turbine, steam engine, or the like. This power is available as a source of energy as for preliminary grinding of the solid. Heat may also be extracted from the steam for preheating the slurry.

The slurry may be made up some distance from the processing site or terminal and pumped to the site in a pipe line. When grinding is not desired, the water can still be vaporized from the solids at the terminal and the resulting steam used as a source of energy. This often effects a sizable saving in transportation costs. An excess quantity of liquid may be used in transporting the solid in the pipe line and the concentration adjusted to the desired value prior to feeding slurry to the heating step.

When the process is to be used primarily as a means for separating the carrying water from the solid particles transported thereby, without substantial grinding, the velocity in the heater coil is maintained at the minimum commensurate with other factors in the process. Generally the velocity will then be maintained below 100 feet per second, and preferably below 25 feet per second for the least amount of grinding.

The suspension is heated by passing it through an elongated externally heated zone of restricted cross-sectional area. The heating may most effectively be carried out in a pipe still type furnace such as those commonly used for heating liquid streams in the refining of petroleum. The suspension is fed into the heated tube at a rate sufficient to prevent settling out of the solid particles. The linear velocity of slurry at the inlet to the heating tube should generally be within the range of from about ½ to 10 feet per second, suitably about 1 foot per second. The velocity of gaseous dispersion of powdered coal and vapor, e. g., at the outlet of the tube, is within the range of from about 25 to about 500 feet per second, suitably about 60 feet per second. Higher velocities may be used.

Without wishing to limit the present invention in any way, the following explanation is offered as a possible mechanism of the disintegrating action obtained in the present process. The high velocity and highly turbulent flow of the vapors through the piping causes innumerable collisions between the particles. This results in a high degree of pulverization which may be carried to the point where the average diameter of the particle is on the order of from 1 to 5 microns. This may be supplemented by the rapid expansion and violent transfer of energy to the solid particles when the liquid is vaporized from the surface of the particles.

Part or all of the vapor may be separated from the dispersion following vaporization. This may be accomplished either before or after extensive pulverization takes place. The process is often operated under pressure such that the steam, or vapor, available upon separation of solid therefrom is at an elevated pressure. In accordance with this invention, steam under pressure is separated from the solid particles and passed to an engine for the generation of power. Generation of steam for power and process use simultaneously with heating and grinding of the solid is an outstanding advantage of the process.

A mixture of solid materials may be treated by the present process to produce a powdered mixture. For example, marl and clay for the manufacture of Portland cement may be slurried together, ground and dried, or partly dried, as desired, by the present process. Solids which are soluble in the liquid may be added to the slurry and evenly distributed on the surface of the insoluble solid material. Impregnated catalysts may be so prepared. As an example, a hydrocarbon synthesis catalysts may be prepared by forming a slurry of magnetite with water containing dissolved potassium carbonate.

The invention will be more readily understood from the accompanying drawings and the following detailed description of preferred modes of operation of the process. For convenience in the description of the process, as illustrated in the drawings, water is referred to as the vaporizable liquid. It is to be understood that while water is taken as a preferred example for the purpose of illustration, other vaporizable liquids may be admixed with or substituted for water.

Figure 2:
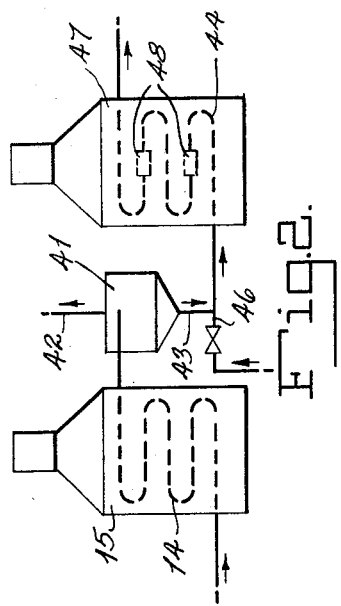

Figure 1 of the drawings is a diagrammatic elevational view showing a suitable arrangement of apparatus for carrying out one modification of the present invention. Figure 2 is a diagrammatic elevational view illustrating a modification of the heating and grinding section of the process. Figure 3 is a diagrammatic elevational view illustrating a suitable arrangement of apparatus for carrying out a preferred modification of this invention.

With reference to Figure 1 of the drawings, a frangible solid in granular form is introduced through line 6 into a mixer 7. Sufficient water to form a fluid dispersion is admitted to the mixer through line 8. Additive materials, e. g., other solid materials, wetting agents, etc., may be added to the mixer through line 9. The resulting suspension of solid particles in water, or slurry, is passed through line 10 to thickener 11 of conventional design wherein excess water is removed to produce a slurry containing the desired relative proportions of liquid and solid. Excess water is discharged from the thickener through line 12 and returned to the mixer.

The slurry is withdrawn from the thickener by way of a pipe line containing a pump 13 from which it is passed through a tubular heater 14. Heat may be supplied to the tubular heater 14 from any suitable source as, for example, by a furnace 15. The slurry is heated to a temperature at least sufficient to vaporize the liquid and the resulting dispersion of solid particles in vapor passed at high velocity through the tubular heating coil 14. The solid is subjected to the disintegrating action of vaporization and the highly turbulent flow resulting from high velocities. Venturis, nozzles, or orifices may be provided in the heater 14 to increase turbulence therein.

The dispersion is discharged through line 16 into a classifier 17. Line 16 may be any desired length to take advantage of additional pulverizing action due to turbulent fluid flow following vaporization. The classifier 17 separates coarse particles from the dispersion. These coarse particles may be returned via line 18 to the mixer. Fine particles of solid entrained in the vapor are discharged from the classifier 17 through line 19 from which the suspension may pass through line 21 for utilization as a dispersion or through line 22 into a separator 23 in which the solid particles are separated from the vapor. Separator 23 may be a cyclone separator, Cottrell precipitator, filter or a combination of these, effective to remove fine particles of solid from the vapor stream. Vapor discharged from the separator 23 through line 25 may be fed to an engine as a source of power or may be passed in heat exchange with cooler streams in the process. Fine particles may be withdrawn as product from the separator 23 through line 24.

Alternatively, the heated solid particles may be passed through line 26 into a drier 27. Since the powdered material is heated, it is, at most, necessary only to strip the solids with a dry gas to effect drying. Often the solids are sufficiently dry, upon discharge from the separator, that no additional drying is required. Distillation of volatilizable constituents from the solid, as in the case of coal, may also be accomplished in the drier. Dry gas may be admitted to the drier 27 through line 28. The dry gas is preferably passed upwardly through a dense phase fluidized bed of the powdered material in the drier. Dry solids may be withdrawn through line 29. The gas is discharged from the drier through line 31 into a separator 32. Particles of powdered solid material entrained in the gas stream leaving the drier are separated from the gas in the separator and discharged through line 33. The gases are discharged through line 34.

Figure 2 illustrates a modification of the heating and pulverizing steps in which means are provided for improving the pulverization over that obtained by the apparatus of Figure 1. In accordance with this modification, the tubular heater 14 serves mainly as a vaporizer. The dispersion of solid particles in vapor discharged from the heating tube 14 is passed to a pulverization zone for additional pulverization. A separator 41 may be provided at the outlet of heating tube 14 by means of which part or all of the vapors may be removed from the solid following vaporization of the liquid. Separation of the vapors, or part of them, is sometimes desirable where the powdered solid may be used admixed with a limited amount of vapors, or with another gas, e. g., air for oxidation. The vapors are discharged from the separator through line 42. These vapors are available at a pressure higher than the pressure at the outlet of the pulverizing zone and, hence, have a relatively high potential for the generation of power, as will be brought out in greater detail hereinafter. The solid material is passed through line 43 into a separate pulverizing zone comprising a conduit 44. Gas may be admitted to the conduit 44 through line 46. This gas may serve to replace part or all of the vapor as the carrying medium for the solids or may be used for treating the solids.

The gasiform dispersion of solids is passed through conduit 44 at high velocity. The conduit 44 may be unheated or heat may be supplied by any suitable means, as, for example, by a furnace 47. Suitable means 48 for increasing turbulence may be provided at one or more points along the conduit 44. These may effect increased turbulence by sudden changes in the velocity or direction of flow of the stream. This may be accomplished by a valve, nozzle, orifice, Venturi, or baffles.

Figure 3 illustrates a preferred embodiment of the process of the present invention as applied to grinding a solid material. Solid material in massive form, i. e., lumps or pieces, is introduced into a suitable grinding apparatus 70 where it is reduced to granular size, for example, to particles ranging from about one-quarter inch in average diameter to about 100 mesh. The resulting granular solid is admixed with sufficient water to form a fluid mixture or slurry in a slurry preparation step 71. This may include mixing and concentrating as described hereinabove in connection with Figure 1.

The slurry is passed through line 72 to a slurry preheater 73. A pump 74 is used to induce flow and to increase the pressure in the feed line 75 to the desired value, which may be, for example, on the order of several hundred pounds per square inch. From the preheater 73 the slurry passes through a tubular heater 76 where it is heated to a temperature sufficient to vaporize all of the water.

The preheater 73 and heater 76 are of the tubular type so that turbulent flow of the slurry is maintained and sedimentation prevented. The preheater and heater serve primarily to vaporize the water in the slurry and form a fluid dispersion of the solids in steam. Since the volume of the steam resulting on vaporization of the water from the slurry is considerably in excess of the volume of water required to form a fluid slurry, steam is present in excess of the amount required for fluid flow of the solid.

We have found that steam substantially completely free of fine solid particles may be separated from the dispersion in a conventional cyclone separator when the amount of steam separated is limited to a maximum of from about 80 to 90 percent of the total steam in the dispersion. Thus it is possible to separate as much as 80 to 90 percent of the steam from the dispersion as a relatively clean stream for the generation of power.

The dispersion of solid particles in steam resulting from vaporization of the water in the heater 76 is discharged into a cyclone separator 77 for separation of part of the steam from the dispersion. Steam separated from the dispersion in separator 77 is discharged into line 79. The extent of the separation may be controlled by valve 78 in line 79.

The pressure drop through the preheater 73 and heater 76 is relatively low. Steam is available at separator 77 at a pressure not far below that at which the slurry is charged by pump 74. Thus there is available as a by-product of the process a relatively large quantity of steam at an elevated pressure suitable for the generation of power.

Fine particles of solid remaining in the steam discharged through line 79 may be removed by a suitable separator 81, for example, a Cottrell precipitator, filter, or a combination of such separating devices. In some instances, it is not necessary to process the steam further after separation in a cyclone separator, depending largely upon the efficiency of the separator and the abrasiveness of the particular solid undergoing treatment. Talc, for example, is only a mild abrasive and may be tolerated in steam fed to a turbine.

The steam from line 79, after processing in separator 81, is passed through line 82 to a suitable engine 83, for example, a steam turbine, where it is used for the generation of power. This power is available for grinding in the grinding step 70. Additional power may also be available for other purposes.

Exhaust steam from the engine passes through line 84 from which it may be directed through line 85 to heat exchanger 73, as determined by valve 86, or to the slurry preparation step 71, as determined by valve 87. Condensate from heat exchanger 73 is returned to the slurry preparation step 71 through line 88. Make-up water is supplied to the slurry preparation step as required through line 89.

The dispersion of solid material in steam discharged from separator 77 through line 91 is passed into a pulverizing zone comprising a conduit 92. The conduit 92 may be unheated, or heat may be supplied by any suitable means as, for example, by furnace 93. Generally, the dispersion passed through conduit 92 will contain at least 15 percent of the water originally present in the slurry. A larger proportion of the steam may be, if desired, passed through the conduit 92 with the solid. The conduit 92 is preferably of relatively small diameter, e. g., one-half to two inches, and relatively long, e. g., 1,000 diameters, so that a considerable pressure drop takes place across the conduit with additional size reduction of the solid material.

The pulverized solid and carrier steam are discharged from the conduit 92 into a separator 94 in which the powdered solid is separated from the steam. Separator 94 may comprise a cyclone separator, Cottrell precipitator, filter, or a combination of such devices effective for removal of fine particles of solid from the steam. Powdered solid is discharged through line 96. The steam may be passed via line 97 to heat exchanger 73 or through line 98 to an engine, heater, or the like, where energy in the form of heat or mechanical energy may be recovered. The pressure in separator 94 and the flow of the various streams through lines 96, 97 and 98 may be controlled by valves 100, 101, and 102, respectively.

It may be desirable to retain some steam in admixture with the powdered solid discharged through line 96 to utilize the energy available from the steam to transport the powdered solid through line 96. For example, if the powdered solid is coal which is to be fed into a burner, sufficient steam may be withdrawn with the coal through line 96 to transport it to the burner some distance from separator 94.

*Example*

As an example of how the process of the invention can be carried out, the transportation and grinding of coal will be described.

A slurry of mechanically ground coal particles in water is made up, containing 50% by weight of bituminous coal ground so that 95% passes a 200 mesh and 90% passes a 325 mesh screen (U. S. Standard).

The slurry is passed by an electrically driven pump through one mile of two inch pipe at a velocity of 3 feet per second, the pressure being 1600 pounds per square inch at the pump. It then enters a coil of 4 inch pipe 800 feet long located within a furnace heated by the combustion of powdered coal.

In the pipe coil the slurry is heated to a temperature of 750° F. to vaporize the water and form a high velocity turbulent stream of coal particles suspended in steam for grinding the coal. From the pipe coil the dispersion is discharged at a pressure of 400 pounds per square inch into a cyclone separator wherein the steam at 400 pounds is separated from the finely ground coal particles.

The separated steam flows to a steam turbine type electrical generator 105 which generates electricity and transmits it through conductor wires 107 and 109 for operating the electrically driven motor 111 and associated slurry feed pump 113.

Dry coal of much finer size than the feed is recovered from the cyclone separator. Part of this recovered coal is employed for firing the heating furnace to vaporize the slurry.

When substantial grinding of the coal particles is not desired, a heating coil is used of much larger diameter than 4 inches to keep down the velocity, for example, 6 inches. Also, conditions are maintained such as to avoid turbulent flow and obtain stream-line flow, as by maintaining the heater coil free of obstructions, constrictions and the like.

Obviously many modifications and variations of the invention as hereinbefore set forth may be made without departing from the spirit and scope thereof and, therefore, only such limitations should be imposed as are indicated in the appended claims.

We claim:

1. A process which comprises forming a flowable mixture of particles of a solid material in water; transporting said mixture as a flowing stream to and through an elongated tubular heating zone; heating said mixture in said heating zone as it flows therethrough sufficiently to vaporize said water to steam at superatmospheric pressure and form a flowing stream of a dispersion of said particles in said steam; separating steam at superatmospheric pressure from said solid material; delivering said steam to an energy recovery zone; recovering energy from said steam in said energy recovery zone; and recovering said particles of solid material substantially free from water.

2. A process in accordance with claim 2 wherein energy is recovered from said steam by conveying said steam through a steam engine as the source of energy for driving said steam engine; and wherein said steam engine generates usable power.

3. A process in accordance with claim 3, wherein said flowable mixture is forced into said heating zone by a pump, said process also comprising actuating said pump by the power generated by said steam engine.

4. A process which comprises forming a slurry of particles of a solid material in water; transporting said slurry to an elongated tubular heating zone; heating said slurry in said heating zone sufficiently to vaporize said water to steam at superatmospheric pressure and form a flowing dispersion of said particles in said steam; passing said dispersion through said heating zone at high velocity in turbulent flow to reduce the size of said particles; separating steam at superatmospheric pressure from said solid material; conveying said separated steam to a steam engine as the source of energy for driving said steam engine; and recovering said solid material from said heating zone.

5. A process which comprises forming a slurry of particles of a solid material in water; transporting said slurry to an elongated tubular heating zone comprising first and second sections; heating said slurry in said first section sufficiently to vaporize said water to steam at superatmospheric pressure and form a flowing dispersion of said particles in said steam; separating from said dispersion high pressure steam in excess of the amount required to transport said particles, for the recovery of energy from said high pressure steam; then passing said dispersion of particles in the remaining steam at high velocity through said second section to effect reduction in the size of said particles; and withdrawing said particles and remaining steam from said second section.

6. A process for finely pulverizing a solid material which comprises rough grinding said solid material to form coarse particles by transmitting energy from a vapor-driven engine to a mechanical grinder; forming a slurry of said coarse particles in a vaporizable liquid; passing said slurry into and through a long tubular grinding zone while heating said slurry to effect vaporization of said liquid in said tubular zone and form a dispersion of said particles in vapor; passing said dispersion at high velocity through the rest of said tubular grinding zone to effect reduction in the size of said particles; separating vapor from said dispersion; conveying said separated vapor to said engine as operating vapor therefor, to effect said rough grinding; and passing vapor from said engine in heat exchange relationship with said slurry ahead of said grinding zone to preheat said slurry.

7. A process for finely pulverizing a solid material which comprises rough grinding said solid material to form coarse particles by transmitting energy from a vapor-driven engine to a mechanical grinder; forming a dispersion of said coarse particles in a flowing stream of vapor; passing said dispersion continuously at a high velocity through a grinding zone to effect reduction in the size of said particles; separating vapor from said dispersion; and conveying said separated vapor to said engine as operating vapor therefor, to effect said rough grinding.

8. A process in accordance with claim 7 wherein said dispersion is formed by suspending said coarse particles in water to form a slurry, and passing said slurry into and through a tubular grinding zone while heating said slurry to effect vaporization of said water to steam.

9. A process for finely pulverizing a solid material which comprises forming a slurry of particles of said material in a vaporizable liquid; passing said slurry into and through a long tubular grinding zone while heating said slurry to effect vaporization of said liquid in said tubular zone and form a dispersion of said particles in vapor; passing said dispersion at high velocity through the rest of said tubular grinding zone to effect reduction in the size of said particles; separating vapor from said dispersion; and passing said vapor in indirect heat exchange relationship with said slurry ahead of said grinding zone to preheat said slurry.

10. A process for finely pulverizing a solid material which comprises forming a flowable mixture of relatively coarse particles of at least one solid disintegratable material in a vaporizable liquid; forcing said mixture into and through an elongated tubular heating zone; heating said mixture during passage through said tubular zone to a temperature well above the boiling point of the liquid component of said flowable mixture at the pressure existing in said zone, vaporizing at least a substantial part of said liquid component during passage through said heating zone, and forming therein a dispersion of solid particles in resulting vapor; passing said dispersion through a succeeding zone of high velocity flow, and subjecting the flowing stream therein to turbulence and a velocity of the order of at least 25 feet per second thereby effecting disintegration of said coarse particles; separating vapor at superatmospheric pressure from said disintegrated solid particles; conveying said separated vapor to a vapor-driven engine as the source of energy for driving said engine; and recovering said disintegrated solid material from said heating zone.

References Cited in the file of this patent

UNITED STATES PATENTS

| | | |
|---|---|---|
| Re. 10,537 | Walker | Oct. 28, 1884 |
| 1,709,533 | Lower | Apr. 16, 1929 |
| 2,669,509 | Sellers | Feb. 16, 1954 |
| 2,735,787 | Eastman et al. | Feb. 21, 1956 |

UNITED STATES PATENT OFFICE
CERTIFICATE OF CORRECTION

Patent No. 2,864,560                                 December 16, 1958

Charles E. Carkeek et al.

It is hereby certified that error appears in the printed specification of the above numbered patent requiring correction and that the said Letters Patent should read as corrected below.

Column 7, line 4, for the claim reference numeral "2" read -- 1 --; line 9, for the claim reference numeral "3" read -- 2 --.

Signed and sealed this 31st day of March 1959.

(SEAL)
Attest:

KARL H. AXLINE
Attesting Officer

ROBERT C. WATSON
Commissioner of Patents